March 25, 1952 — C. E. LINDEN ET AL — 2,590,629

TOOL EJECTOR

Filed Feb. 28, 1948 — 3 Sheets-Sheet 1

INVENTORS
Carl E. Linden
BY Frank O. Wetzel
Wood, Auey, Herron & Evans
ATTORNEYS

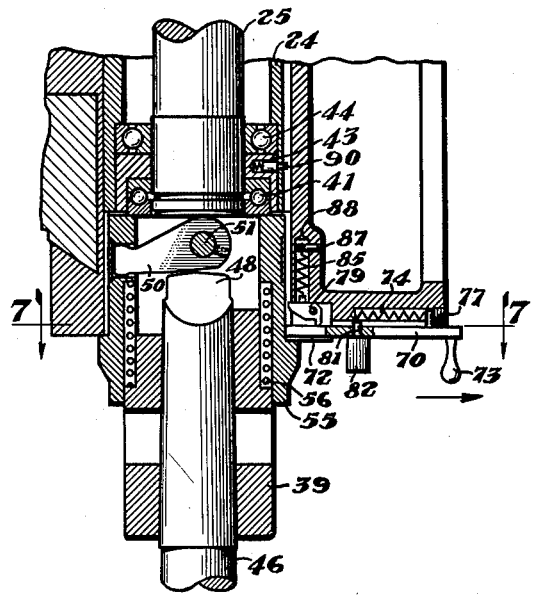
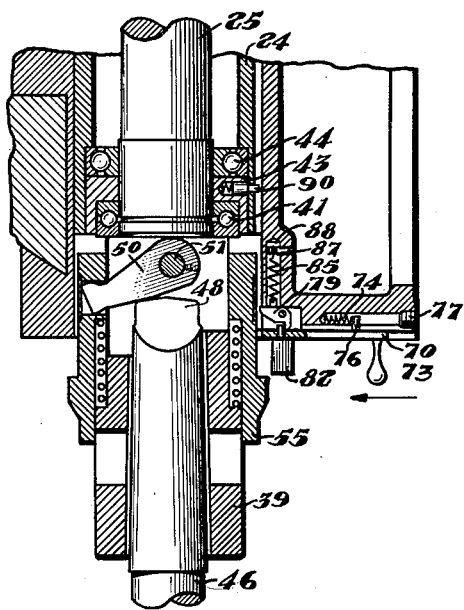
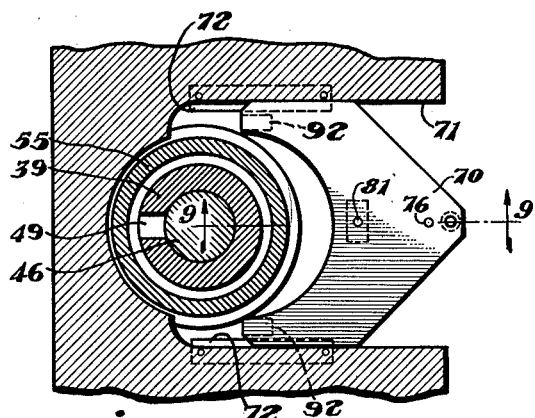
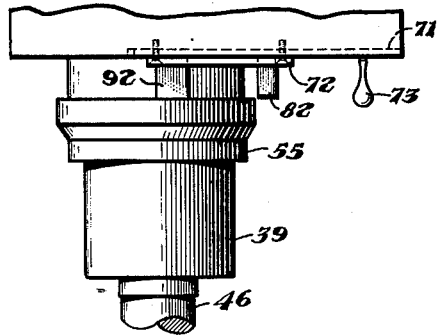
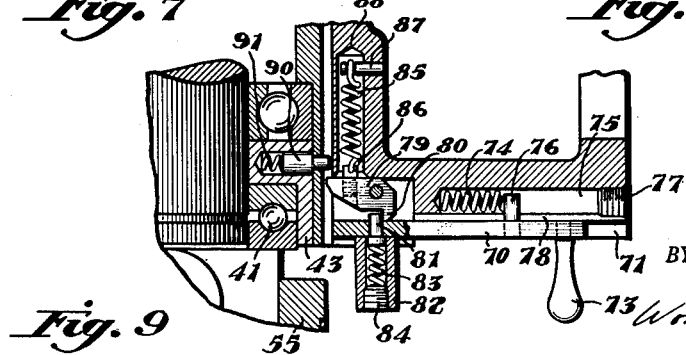

March 25, 1952 C. E. LINDEN ET AL 2,590,629
TOOL EJECTOR
Filed Feb. 28, 1948 3 Sheets-Sheet 3
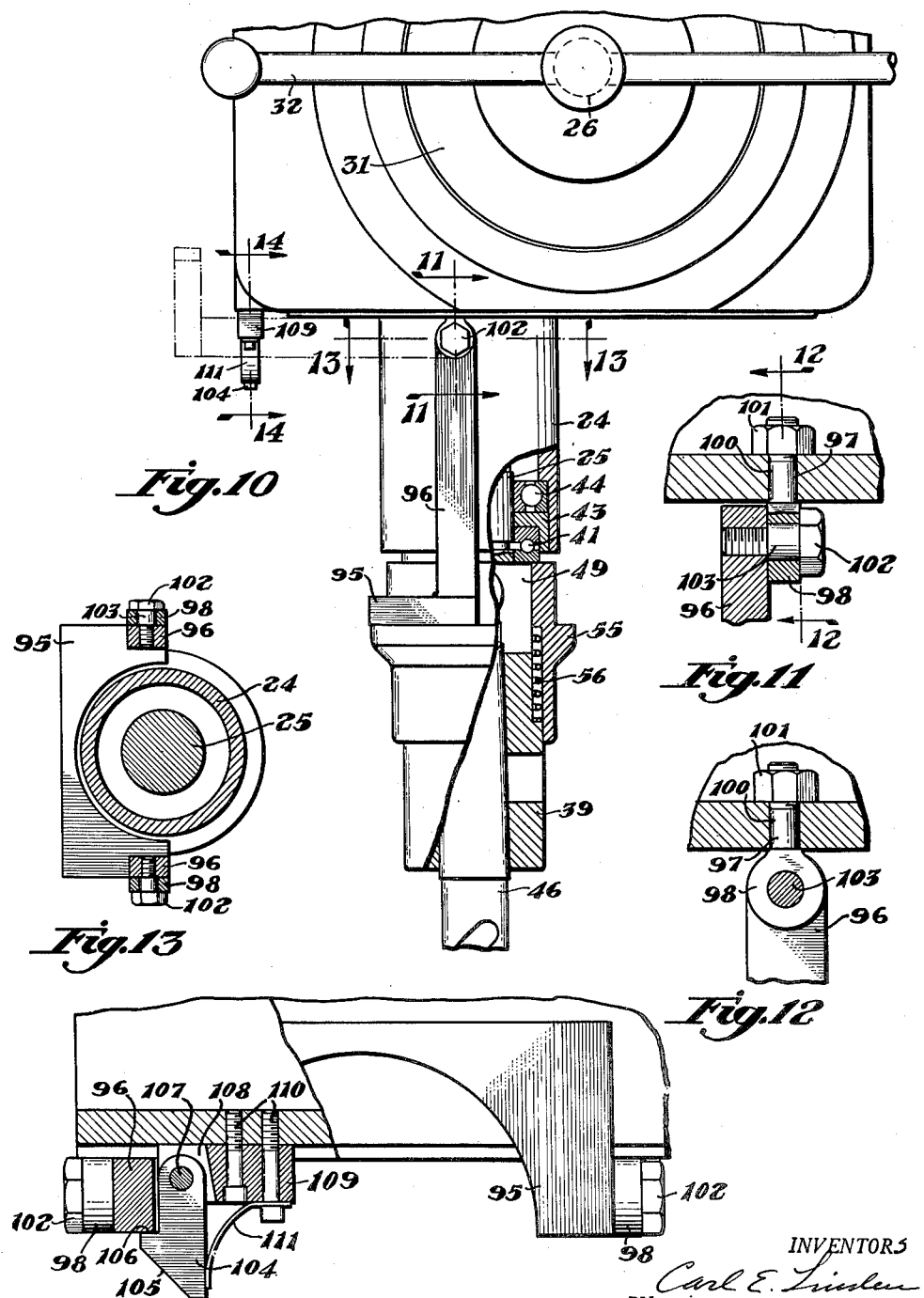
INVENTORS
Carl E. Linden
BY Frank O. Wetzel
Wood, Arey, Herron & Evans
ATTORNEYS Patented Mar. 25, 1952

2,590,629

UNITED STATES PATENT OFFICE 2,590,629

TOOL EJECTOR

Carl E. Linden, Cincinnati, and Frank O. Wetzel, Norwood, Ohio, assignors to The Fosdick Machine Tool Company, Cincinnati, Ohio, a corporation of Ohio Application February 28, 1948, Serial No. 11,948

5 Claims. (Cl. 77—55)

This invention relates to tool holders or chucks and is particularly directed to improvements in devices for ejecting the tool from the holder or chuck. The present improvement of this art is particularly applicable to a translatable spindle mechanism of the type employed in the drill head of a radial drill.

In the drilling art, for example, the spindle is translated within the drill head during the drilling operation. Drills of substantial size are employed and the problem of tool removal is difficult and causes a considerable loss of time when frequent removal of the tool is required. In the past, it has been the practice to use a drift tool effective through the side of the drill socket or chuck for wedging the tool from its tapered socket connection. It will be appreciated that when the tool has been forced against the work, the tool becomes firmly engaged in the tapered socket and requires considerable force before removal can be accomplished. The tool driving spindle in radial drills, for example, can be translated to bring the tool close up under the drill head. The present concept has been to make use of this translatory movement of the drill spindle for the operation of ejecting or knocking the tool from its tapered socket.

The broad general object has been to provide a tool ejector which is actuated by continued upward movement of the spindle after the tool has been withdrawn from the work, in other words, toward the upper limit of spindle translation. More specifically, it has been the object to provide relatively movable parts related to the spindle which will be effective upon engagement thereof with the bottom of the head or abutment means for applying a tool ejecting force directly upon the socketed end of the tool so that the force of ejection is applied axially and in a direction effective for quick disengagement of the tool from its tapered socket. Further, it has been the object to apply this ejecting force through a leverage mechanism which wedges or cams the tool out of connection with the socket.

It has been a further object of the present inventor to provide a tool ejector mechanism which includes means for causing displacement of the abutment when ejection of the tool is not required. Further, it has been provided that the abutment means is mounted so as to be conveniently swung or slid out of position and securely held in position of non-use when the operator so desires.

It has been a still further object of the present inventor to provide abutment means for actuating the ejector which can be placed in position for tool ejection during the last tool operation and which will cause tool ejection on the ensuing upstroke or tool retracting stroke, and the next succeeding down-stroke of the spindle will be effective for tripping the abutment mechanism whereupon it will automatically retract to a position of non-use.

Through the use of this improved tool ejection mechanism, the removal of heavy tools is greatly simplified in that the operator may hold the tool with one hand and cause ejection thereof by raising the spindle with the other hand. Further, the device is constructed so that ordinary upward coasting of the spindle as the tool is withdrawn from the work, is insufficient to cause dislodgement of the tool and it is necessary to apply further pressure to translate the spindle as the ejecting device becomes effective for ejecting the tool from the socket.

The average travel of the spindle will range between 18 and 20 inches on the larger radial drills. Because of this it may be desirable to eject the tool with the spindle in a lower position and it is for this reason that displaceable abutments are provided as set out in the foregoing objects. As stated, the movable abutments normally remain clear of the spindle and the tool ejector until they are required for causing ejection, whereupon they are easily moved into effective position.

Other objects relate to improvements in the various details of the structure wherein the device is immediately effective for a quick ejection of the tool, whereby maximum pressure is applied in the proper direction for forcing the tool from the socket and, whereby the abutment which causes the ejecting movement is efficiently mounted and easily retracted when desired.

Other objects and certain advantages of the invention will be more fully set forth in the description of the accommanpanying drawings in which:

Figure 5 is a fragmentary sectional view taken similar to Figure 1 but illustrating a modified form of the invention.

Figure 6 is a fragmentary sectional view taken the same as Figure 5 but illustrating the mechanism in the operation of ejecting the tool.

Figure 7 is a sectional view taken on line 7—7, Figure 5, detailing the mounting and construction of the displaceable abutment means of the tool ejector.

Figure 8 is a fragmentary external view illustrating the abutment in position for causing tool ejection.

Figure 9 is a fragmentary sectional view taken on line 9—9, Figure 7, showing the abutment member and detailing the parts associated therewith, the view depicting the abutment in operative position.

Figure 10 is a fragmentary front view of a drill head illustrating a further modification of the ejector means, particularly the displaceable abutment unit.

Figure 11 is a sectional view taken on line 11—11, Figure 10, detailing the pivotal mounting of the displaceable abutment unit.

Figure 12 is a sectional view taken on line 12—12, Figure 11, further detailing the pivotal mounting.

Figure 13 is a sectional view taken on line 13—13, Figure 10, showing the displaceable abutment unit in detail.

Figure 14 is a sectional view taken on line 14—14, Figure 10, showing the displaceable abutment swung up out of position of use and illustrating the details of the catch for holding it in retracted position.

The present improvements can be applied to any tool spindle. For purposes of illustration and to indicate one use, the improvement is shown as applied to the drill spindle of a radial drill.

Figure 1:
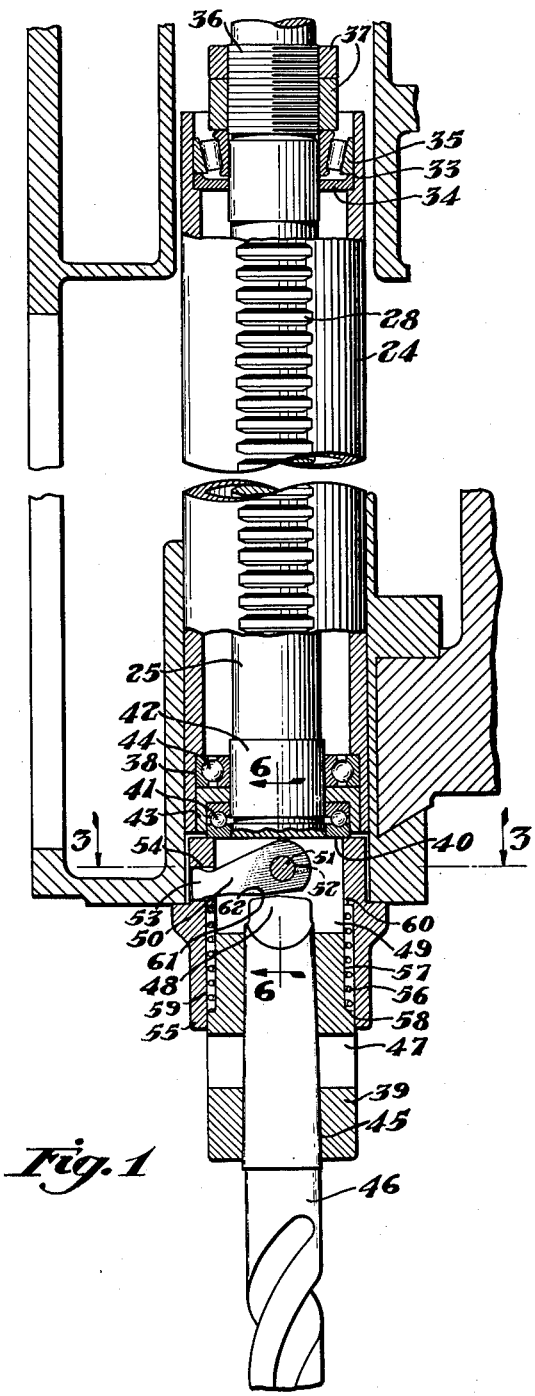
Figure 1 is a sectional view detailing the construction of a spindle, particularly the tool ejector mechanism incorporated in the tool chuck.

As shown in the sectional view, Figure 1, a translatable sleeve 24 is vertically slidably mounted in the head. This sleeve supports the drill spindle 25. The sleeve is translated by means of a hand rotated shaft 26 (Figure 10). This shaft carries a rack gear (not shown) engaging the rack teeth 28 formed along the spindle sleeve. The shaft 26 is journalled in the drill head and appropriate dial mechanism 31 is fixed to the shaft. At the front end of the shaft, handle members 32—32 are disposed diametrically and provide the means whereby the operator may raise and lower the drill spindle by hand.

The driving mechanism for rotating the spindle is not shown but it will be understood that it may be of any conventional design. Since the invention is primarily concerned with ejection of the tool by translation of the drill spindle, it is not believed necessary to extend the description beyond the mounting of the spindle and the related ejector mechanism.

The spindle 25, as stated, is journalled within the translatable sleeve 24. As illustrated in Figure 1, bearings are provided at the upper and lower ends of the sleeve. At the upper end, the sleeve is counter-bored as at 33 to provide a shoulder. A thrust bearing washer 34 is supported on this shoulder and includes a central bore through which the spindle is disposed. A thrust bearing 35 supports the spindle on this washer. The spindle includes a threaded intermediate portion 36 just above the bearing upon which are threaded a pair of nuts 37—37. The lower of these nuts engages the inner race of the bearing, the outer race being engaged upon the washer. Accordingly by tightening the nuts, the bearing races are fixed in position and a proper anti-friction journal is provided for the spindle.

At the lower end of the spindle sleeve, the arrangement of the bearing is as follows. The lower end of the sleeve is counter-bored as at 38. The lower end of the spindle includes an enlarged chuck or socket portion 39. A shoulder 40 is thus provided adjacent the lower end of the spindle. An end thrust ball bearing 41 is disposed about the bearing portion 42 of the spindle and rests on the shoulder 40. A spacer element in the form of an inverted cup shape washer 43 is disposed on the bearing 41 and a second ball bearing 44 is disposed about the bearing portion 42 and is engaged about the top of the spacer. This latter bearing engages the shoulder of the spindle sleeve formed by the counter-bore and thus these bearings are disposed between the spindle and the spindle sleeve. The nuts 37—37 draw the spindle upwardly and hold the headed portion thereof against the lower bearing assembly. The upper bearing 44 of the lower bearing assembly is a lateral thrust bearing and thus the lower bearing assembly takes care of both lateral and end thrusts.

Figure 3:
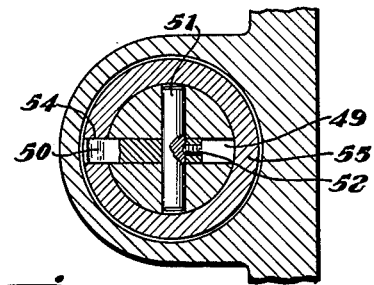
Figure 3 is a sectional view taken on line 3—3, Figure 1, detailing the pivotal mounting of the ejector lever.
Figure 4:
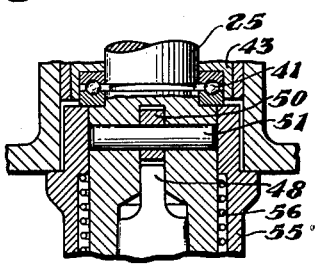
Figure 4 is a sectional view taken on line 4—4, Figure 1, illustrating further details of construction of the ejector mechanism.

The ejector means is contained within the chuck or socket end of the spindle. The socket 45 at the lower end of the spindle is tapered to receive the tapered end of the drill 46. The usual driving key opening 47 is provided through the chuck bisecting the tapered socket. The upper end 48 of the tool is normally disposed within a slot 49 formed diametrically through the upper end of the chuck portion. This slot provides clearance for a swinging ejector lever 50 pivotally mounted on a pin 51 (Figures 3 and 4) disposed diametrically through the socket at right angles to the slot. Screw 52 secures the lever to the pin. Thus, the inner pivoted end of the lever is within the confines of the chuck, while the outer end 53 projects beyond the chuck portion and is engaged within a radial slot 54 in an actuator sleeve 55.

The actuator sleeve is mounted for axial movement relative to the chuck. This sleeve is normally held in position wherein the lever is in position of non-use. For this purpose a coil spring 56 is disposed around the chuck portion. The chuck portion is counter-turned as at 57 to provide a shoulder 58 engaged by the lower end of the spring. The ejector sleeve includes a counter-bore 59 and this counter-bore provides a shoulder 60 engaged by the upper end of the spring. In other words, the respective bore and counter-turn provide an annular chamber within which the spring is disposed. The spring urges the ejector sleeve upwardly so that its upper end contacts the underside of the ball bearing, the ball bearing, therefore, constituting a limit stop. In this position of the sleeve, the lever is clear of the upper end 48 of the tool, the clearance being indicated at 61. The undersurface of the lever is formed to provide an inclined camming surface 62.

Figure 2:
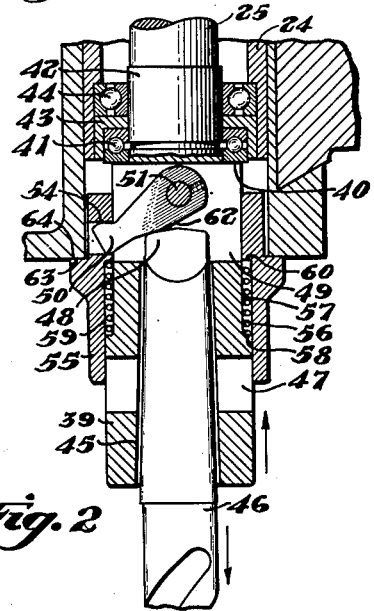
Figure 2 is a fragmentary sectional view taken the same as Figure 1 but illustrating the mechanism in position where the tool is being ejected.

In Figure 2, the ejection of a tool is disclosed. It will be noted here that the spindle has been moved upwardly a sufficient distance to cause swinging of the lever. For this purpose the sleeve 55 includes a shoulder 63 disposed entirely around the sleeve and adapted to abut the underside of the head as at 64. When this occurs, the ejector sleeve cannot move upwardly but the chuck or spindle continues to move upwardly carrying the pivot point of the lever with it. Since the outer end of the lever is contained in the slot 54 of the sleeve, it follows that the lever is swung downwardly. The underside of the lever has camming engagement with the upper end of the tool (Figure 2) and is effective for pushing the tool out of its socket. In order to eject a tool, the operator has but to raise the spindle and sleeve until the ejector sleeve is bumped against the bottom of the tool head and the tool is thereupon ejected axially downwardly from the socket.

First modification

The modification herein concerned is illustrated in Figures 5 to 9 inclusive. Its purpose is to provide a displaceable abutment for the ejector mechanism so that the ejector may operate to eject the tool only when the operator desires such ejection. The structure of the spindle and the tool chuck are the same as in the preceding form in so far as the ejector lever and its operating sleeve are concerned.

It is desirable that the structure provide for tool ejection at a particular time. In the arrangement shown, the abutment may be placed in ejecting position at any time during the last drilling operation prior to changing tools. The abutment will not be displaced from effective position on the next up-stroke of the spindle, that is, the one following the last operation in order that ejection of the tool will occur. In other words, as the ejector sleeve engages the abutment, the tool will be knocked from the chuck. On the following down-stroke of the spindle, the slide will be automatically tripped into non-ejecting position.

In order to accomplish this operation, a laterally horizontally slidable abutment plate 70 is provided. This plate 70 slidably operates in a guide arrangement provided by slotting or grooving the underside of the head as indicated at 71. The groove 71 is wider than the diameter of the ejector sleeve as will be apparent from Figure 7 and terminates slightly beyond the center line of the drill spindle. The plate is of the same approximate width as the groove with sufficient clearance for easy sliding motion. The plate is held in position in the groove by means of gib plates 72—72 fixed along the underside of the head along the margin of the groove and underlying the plate, a handle 73 projecting downwardly below the head from the outer end of the plate.

This abutment plate 70 is constantly urged outwardly by means of a coil spring 74 disposed under compression between the inner end of a bore 75 and a pin 76 projecting upwardly from the abutment plate into the bore. The bore extends parallel with the plate, and its outer end is closed by means of a screw plug 77. A slot 78 is provided along the lower portion of the bore so as to provide clearance for the pin permitting it to operate along the length of the bore.

The abutment plate may be held in operative position by means of a pivotally mounted latch element 79 having a hook portion 80 adapted to engage over a detent pin 81 mounted in the abutment plate. The abutment plate carries a mounting block for the pin 81, this consisting of an element 82 projecting downwardly from the underside of the plate. A detent spring 83 is disposed under compression within the element 82 and between a plug 84 in the end of the member and the head of the pin. The head of the pin limits upward movement but permits the pin to project above the plate. As the plate is slid inwardly to effective position, the detent pin will depress to clear the hook and will snap into position in front of the hook when the abutment plate is in position.

The catch or hook element 79 is constantly urged into effective position by means of a spring 85 disposed under tension between a stud 86 in the inner end of the catch element and a pin 87 projected into the upper end of the bore 88 in which the spring is mounted. A tripping detent element 90 is mounted in the spacer collar 43 which lies between the ball bearings. This detent is disposed in a radial bore in the spacer element and includes the usual detent spring 91. The outer end of the detent is of reduced diameter and projects through a bore in the side of the sleeve sufficiently so as to engage the inner end of the hook or catch 79 as the spindle is translated.

In the operation of this modified device, the slide is pushed inwardly by means of the handle 73. The detent in the slide or abutment plate will depress as it engages the hook and will snap into position in front of the hook whereupon the abutment plate is held in position against the action of the spring 74. The plate includes downwardly extended lugs 92, one at each side of the spindle. In other words, the plate thus straddles the spindle and these downwardly projected lugs lie in position above the shoulder of the ejector sleeve so that when the ejector sleeve moves up with the spindle, they will be effective for sliding it on the chuck and ejecting the tool in the manner previously disclosed. With the abutment plate in its effective or inner position, the detent 90 will ride past the catch without tripping it as the spindle comes up and the tool is ejected. On the down-stroke of the spindle, the detent 90 effectively engages the catch and trips it, raising its outer end, that is, the hook portion, permitting the spring to retract the abutment plate to its ineffective position. Thus, it is possible for the operator to operate the mechanism, that is, to perform drilling operations thereafter without accidental ejection of the tool since the abutment plate has been automatically retracted.

Second modification

In the modification disclosed in Figures 10 to 14, inclusive, another variation of the removable abutment is disclosed. The arrangement is such here that the ejection of the tool takes place well below the upper limit of spindle translation. As indicated in the drawings, the spindle assembly, at the position of tool ejection, is disposed so that the shoulder of the sleeve is well below the head. In order to cause ejection, a pivoted abutment plate 95 is provided. This plate is semi-circular, designed to encircle half of the sleeve. It includes an upwardly extended arm 96 at each side of the spindle and the upper ends of these arms are pivotally attached to the underside of the head. The attachment (Figures 11 and 12) is to studs 97. These studs are secured in the base of the head in vertical positions. They include head portion 98, stud portions 100, and nuts 101 threaded on the studs and drawing the heads against the underside of the drilling head. Bearing screws 102 pass through bores in the heads of the studs and are screw threaded into bores in the upper ends of the arms. The bearing screws include bearing portions 103. The bearing portion in each instance has its outer shoulder tightly engaged against the side of the arm when the bearing screw is tightened and the bearing portion is of sufficient length to permit freedom of pivotal movement.

The swinging abutment plate is held in position of non-use by a detent catch 104 (Figure 14). The arm at the left hand side engages the cam portion 105 of the detent catch and presses the detent catch away to permit the arm to move into position above the hook shoulder 106 of the detent. The detent is pivoted on a pin 107 mounted across a slot 108 in the support block 109. Screws 110 hold the block in position on the underside of the head. One of the screws holds the fixed end of a leaf spring 111 and the outer free end of the spring yieldably engages the back of the detent.

Thus, the swinging abutment may be raised to horizontal position when not needed and is held there by the detent. When its use is desired for ejecting the tool, the detent is released and the abutment drops into operative position relative to the shoulder of the ejector sleeve (Figure 10). In the case of this modification, the removal of the abutment is not automatic as in the preceding modification.

Having described our invention, we claim:

1. In combination with apparatus for ejecting a tool from the socket of a spindle which is translatably mounted in a drill head, said apparatus being of the type comprising a sleeve slidably mounted on the spindle and which is operatively connected with tool ejector means adapted to be actuated upon longitudinal movement of the sleeve relative to the spindle, means for effecting relative movement between the sleeve and spindle comprising; a slide mounted on the drill head adjacent the spindle, an abutment carried by the slide, said slide being movable into and out of a position in which the abutment is engageable by the sleeve upon retraction of the spindle relative to the drill head, spring means urging said slide out of said position, catch means adapted to hold said slide when it is manually set in said position, and means carried by said spindle for automatically releasing said catch means when the spindle is extended after retraction.

2. In combination with apparatus for ejecting a tool from the socket of a spindle which is translatably mounted in a drill head, said apparatus being of the type comprising a sleeve slidably mounted on the spindle and which is operatively connected with tool ejector means adapted to be actuated upon longitudinal movement of the sleeve relative to the spindle, means for effecting relative movement between the sleeve and spindle comprising; a movable member mounted on the drill head adjacent the spindle, said member being movable into and out of abutting position in which said member is engageable by the sleeve upon retraction of the spindle relative to the drill head, spring means urging said movable member out of said abutting position, catch means adapted to hold said member in abutting position when manually set in said position, and catch release means carried by said spindle effective upon translation of the spindle from retracted toward extended position for automatically releasing said catch whereby the movable member moves out of said abutting position.

3. In combination with apparatus for ejecting a tool from the socket of a spindle which is translatably mounted in a drill head, said apparatus being of the type comprising a sleeve slidably mounted on the spindle and which is operatively connected with tool ejector means adapted to be actuated upon longitudinal movement of the sleeve relative to the spindle, means for effecting relative movement between the sleeve and spindle comprising; a slideway associated with the drill head extending radially from the spindle, a slide mounted in said ways, an abutment carried by the slide near the spindle end thereof and engageable with said sleeve upon retraction of the spindle relative to the drill head, spring means urging said slide outwardly from said spindle, a detent pin carried by said slide, a latch mounted in said drill head and engageable with said detent pin for latching the slide when said slide is moved manually inwardly to a position in which the abutment means is in position for engagement with said sleeve, and means carried by the spindle adapted to release said latch when the spindle is translated toward extended position and permitting said slide to move outwardly relative to the spindle carrying said abutment means out of position for engagement with the sleeve.

4. In combination with apparatus for ejecting a tool from the socket of a spindle which is vertically translatably mounted in a drill head, said apparatus being of the type comprising a sleeve slidably mounted on the spindle and which is operatively connected with tool ejector means adapted to be actuated upon upward movement of the spindle relative to the slidable sleeve, means for effecting said relative movement comprising; a movable member mounted on the underside of the drill head adjacent the spindle, said member being constructed and arranged to be moved into and out of abutting position in which said member is engageable by the sleeve upon retraction of the spindle toward the drill head, spring means urging said movable member out of abutting position, catch means adapted to hold said slide when it is manually set in abutting position, and means for releasing said catch means when the spindle is translated downwardly after retraction.

5. In combination with apparatus for ejecting a tool from the socket of a spindle which is translatably mounted in a drill head, said apparatus being of the type comprising slidable means carried by the spindle and movable longitudinally thereof, said slidable means being operatively connected with tool ejector means and adapted to actuate said tool ejector means upon longitudinal movement of the slidable means relative to the spindle, means for effecting relative movement between the slidable means and spindle comprising; a movable member mounted on the drill head adjacent the spindle, said member being movable into and out of a position in which said member is engageable by the slidable means carried by the spindle upon retraction of the spindle relative to the drill head, spring means urging said movable member out of said position, a detent adapted to latch said movable member in said position, and a detent release carried by said spindle for automatically releasing said detent upon translation of the spindle from retracted toward extended position.

CARL E. LINDEN.
FRANK O. WETZEL.

REFERENCES CITED

The following references are of record in the file of this patent:

UNITED STATES PATENTS

| Number | Name | Date |
|---|---|---|
| 2,341,051 | Lustrik | Feb. 8, 1944 |

FOREIGN PATENTS

| Number | Country | Date |
|---|---|---|
| 57,255 | Austria | Jan. 10, 1913 |
| 168,210 | Switzerland | Mar. 31, 1934 |
| 256,283 | Great Britain | Aug. 3, 1926 |
| 303,567 | Great Britain | Jan. 10, 1929 |
| 539,123 | Great Britain | Aug. 28, 1941 |